United States Patent
Ikehata et al.

(10) Patent No.: US 8,761,843 B2
(45) Date of Patent: Jun. 24, 2014

(54) BATTERY AND WIRELESS COMMUNICATION APPARATUS

(75) Inventors: Kazuhiko Ikehata, Osaka (JP); Hiroyuki Takebe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 13/496,424

(22) PCT Filed: Jun. 16, 2010

(86) PCT No.: PCT/JP2010/060244
§ 371 (c)(1),
(2), (4) Date: Mar. 15, 2012

(87) PCT Pub. No.: WO2011/033832
PCT Pub. Date: Mar. 24, 2011

(65) Prior Publication Data
US 2012/0169439 A1  Jul. 5, 2012

(30) Foreign Application Priority Data
Sep. 18, 2009 (JP) .................. 2009-217822

(51) Int. Cl.
*H04M 1/00* (2006.01)
*H02J 7/00* (2006.01)

(52) U.S. Cl.
USPC ................... 455/573; 320/107; 320/112

(58) Field of Classification Search
USPC ............. 455/572, 573, 550.1, 343.1, 317; 320/114, 112, 107; 340/636.1
See application file for complete search history.

(56) References Cited

U.S. PATENT DOCUMENTS

| | | | |
|---|---|---|---|
| 7,592,775 B2 * | 9/2009 | Altemose et al. | 320/128 |
| 8,203,493 B2 * | 6/2012 | Sato et al. | 343/702 |
| 8,305,036 B2 * | 11/2012 | Toya et al. | 320/108 |
| 2012/0242283 A1 * | 9/2012 | Kim et al. | 320/108 |

FOREIGN PATENT DOCUMENTS

| | | |
|---|---|---|
| JP | 11-55148 A | 2/1999 |
| JP | 2000-12101 A | 1/2000 |
| JP | 2006-19842 A | 1/2006 |
| JP | 2007-201762 A | 8/2007 |
| JP | 2007-242500 A | 9/2007 |
| JP | 2008-277965 A | 11/2008 |
| JP | 2009-193873 A | 8/2009 |

OTHER PUBLICATIONS

International Search Report, PCT/JP2010/060244 dated Sep. 21, 2010.

* cited by examiner

*Primary Examiner* — Sonny Trinh
(74) *Attorney, Agent, or Firm* — Birch, Stewart, Kolasch & Birch, LLP

(57) ABSTRACT

Used is a battery a battery (100) including: a battery terminal (106); a circuit (108) being electrically connected with the battery terminal (106); and a resonance frequency adjusting section (110) being directly connected or capacitively-coupled with the circuit (108), and being electrically connected with the battery terminal (106) not via the circuit (108). This makes it possible to provide a battery which does not require electrical connection except via a battery terminal for connection with an apparatus on which the battery is mounted, and which battery is unlikely to deteriorate an antenna characteristic.

16 Claims, 7 Drawing Sheets

BATTERY AND WIRELESS COMMUNICATION APPARATUS

TECHNICAL FIELD

The present invention relates to a battery and a wireless communication apparatus, in particular, to a battery which includes an internal circuit and to a wireless communication apparatus on which the battery is mounted.

BACKGROUND ART

Recently, batteries are under development which have internal circuits such as a charge control circuit. In a case where such a battery is mounted on a wireless communication apparatus, the battery may adversely affect an antenna characteristic of the wireless communication apparatus. That is, when a high-frequency current passes through the circuit, the circuit operates like an antenna so that a radiation characteristic of the wireless communication apparatus is deteriorated. For example, as shown in FIG. 10, reduced is a gain in a frequency band of the antenna of the wireless communication apparatus.

FIG. 11 is a perspective view illustrating a schematic arrangement of a battery 900 according to a conventional technique. As illustrated in FIG. 11, the battery 900 has, in a case 902 having a battery terminal 906, a cell 904 and a circuit 908 which is electrically connected with the battery terminal 906. The circuit 908 is, e.g., a charge control circuit.

FIG. 12 is a cross-sectional view illustrating a schematic arrangement of a wireless communication apparatus 20 on which the battery 900 is mounted. As illustrated in FIG. 12, provided on a main body 21 of the wireless communication apparatus 20 are an antenna 22, a ground section 23 of a substrate of the main body 21, and an apparatus terminal 24. The apparatus terminal 24 and the battery terminal 906 constitute a battery connector.

In FIG. 12, arrows indicate a flow direction of the high-frequency current. As illustrated in FIG. 12, in the battery 900 according to the conventional technique, the circuit 908 operates like an antenna. That is, in a case where an electrical length of the circuit 908 is close to (1+2n)/4 wavelength (n: integer), a high-frequency current which resonates at the frequency of the wavelength passes through the circuit 908. This causes radiation from the circuit 908 so that an antenna characteristic of the antenna 22 is deteriorated.

As a technique for dissolving such a problem, Patent Literature 1 discloses such a technique that a conductive section of a battery and a ground section of a portable wireless apparatus are also electrically connected except via a battery terminal so that deterioration in antenna characteristic is suppressed.

FIG. 13 is a cross-sectional view illustrating a schematic arrangement of a wireless communication apparatus 30 disclosed in Patent Literature 1. As illustrated in FIG. 13, a battery 1000 which is mounted on the wireless communication apparatus 30 has: a battery terminal 1006, a circuit 1008 which is electrically connected with the battery terminal 1006; and a connecting section 1030 for connection with a ground section 33 of the wireless communication apparatus 30 except via the battery terminal 1006. Provided on a main body 31 of the wireless communication apparatus 30 are an antenna 32, an apparatus terminal 34 for connection with the battery terminal 1006, and a connecting section 35 for connection with the connecting section 1030. A ground line of the apparatus terminal 34 and the connecting section 35 are connected with the ground section 35.

Thus, the wireless communication apparatus 30 disclosed in Patent Literature 1 is different from the wireless communication apparatus 20 in that the connecting section 35 is provided for electrical connection with the circuit of the battery except via the battery terminal. Similarly, the battery 1000 disclosed in Patent Literature 1 is different from the battery 900 in that the connecting section 1030 is provided for electrical connection with the ground section of the wireless communication apparatus except via the battery terminal. These arrangements make it possible to suppress the deterioration in antenna characteristic of the antenna 32.

That is, as illustrated in FIG. 13, a high-frequency current (indicated by dashed arrows in FIG. 13) is passed in the battery 1000 from the connecting section 1030 to the battery terminal 1006 so that resonance is not caused in the circuit 1008 due to a high-frequency current (indicated by arrows in FIG. 13).

Citation List

Patent Literatures

Patent Literature 1
Japanese Patent Application Publication, Tokukaihei, No. 11-55148 A (Publication Date: Feb. 26, 1999)

SUMMARY OF INVENTION

Technical Problem

However, the technique of Patent Literature requires that the battery be electrically connected with the ground section of the wireless communication apparatus except via the battery terminal. This makes it difficult to readily mount and dismount the battery on/from the wireless communication apparatus. Further, it is necessary to provide members for connection, to the battery and the ground section of the wireless communication apparatus, respectively. This requires additional costs.

The present invention was made in view of the problems. An object of the present invention is to provide a battery which does not require electrical connection, except via the battery terminal, with an apparatus on which the battery is mounted, and which battery is unlikely to deteriorate an antenna characteristic.

Solution to Problem

In order to attain the object, a battery of the present invention includes: a battery terminal; a circuit being electrically connected with the battery terminal; and a resonance frequency adjusting section being directly connected or capacitively-coupled with the circuit, and being electrically connected with the battery terminal not via the circuit.

According to the arrangement, the resonance frequency adjusting section is connected with the circuit so as to change an electrical length of an antenna constituted by the circuit. Further, the antenna constituted by the circuit is such that the circuit is electrically connected with the battery terminal, and the antenna is electrically connected with the battery terminal not only via the circuit but via the resonance frequency adjusting section. This changes the antenna from a $\frac{1}{4}\lambda$ antenna to a $\frac{1}{2}\lambda$ antenna. This causes a large change in resonance frequency of the antenna constituted by the circuit. Therefore, even if the resonance frequency adjusting section is not connected with the circuit, and therefore, resonance of the antenna constituted by the circuit deteriorates an antenna characteristic of a neighboring antenna, the provision of the resonance frequency adjusting section makes it possible to readily prevent the deterioration in antenna characteristic by shifting, outside a frequency band of the neighboring antenna (i.e., a frequency band used by a wireless communication apparatus or the like including the neighboring antenna), a resonance frequency of the former antenna in such a manner that an electrical length of the former antenna is changed so that a large change is caused in its resonance frequency.

The resonance frequency adjusting section only has to be connected with the circuit and the battery terminal, and does not require any electrical connection, except via the battery terminal, with an apparatus on which the battery is mounted. Therefore, the arrangement above makes it possible to provide a battery which does not require electrical connection, except via the battery terminal, with the apparatus on which the battery is mounted, and which battery is unlikely to deteriorate the antenna characteristic.

Further, a battery of the present invention may include: a battery terminal; a circuit being electrically connected with the battery terminal; and a resonance frequency adjusting section being directly connected or capacitively-coupled with the circuit, and being electrically connected with the circuit only.

According to the arrangement, the resonance frequency adjusting section is connected with the circuit so as to change an electrical length of an antenna constituted by the circuit. This causes a change in resonance frequency of the antenna constituted by the circuit. Therefore, even if the resonance frequency adjusting section is not connected with the circuit, and therefore, resonance of the antenna constituted by the circuit deteriorates an antenna characteristic of a neighboring antenna, the provision of the resonance frequency adjusting section makes it possible to prevent the deterioration in antenna characteristic in such a manner that a change is caused in resonance frequency of the former antenna so that the resonance frequency is shifted outside a frequency band of the neighboring antenna (i.e., a frequency band used by a wireless communication apparatus or the like including the neighboring antenna).

The resonance frequency adjusting section only has to be connected with the circuit, and does not require any electrical connection, except via the battery terminal, with an apparatus on which the battery is mounted. Therefore, the arrangement above makes it possible to provide a battery which does not require electrical connection, except via the battery terminal, with the apparatus on which the battery is mounted, and which battery is unlikely to deteriorate the antenna characteristic.

Advantageous Effects of Invention

According to the battery of the present invention, the resonance frequency adjusting section is connected with the circuit. Therefore, even if the resonance frequency adjusting section is not connected with the circuit, and therefore, resonance of the antenna constituted by the circuit deteriorates an antenna characteristic of a neighboring antenna, the provision of the resonance frequency adjusting section makes it possible to prevent the deterioration in antenna characteristic in such a manner that a change is caused in resonance frequency of the former antenna so that the resonance frequency is shifted outside a frequency band of the neighboring antenna (i.e., a frequency band used by a wireless communication apparatus or the like including the neighboring antenna). The resonance frequency adjusting section does not require any other electrical connection with an apparatus on which the battery is mounted, than the electrical connection with the apparatus via the battery terminal. Therefore, the present invention makes it possible to provide a battery which does not require electrical connection with the apparatus on which the battery is mounted, except the electrical connection with the apparatus via the battery terminal, and which battery is unlikely to deteriorate the antenna characteristic.

DESCRIPTION OF EMBODIMENTS

Embodiment 1

Figure 1:
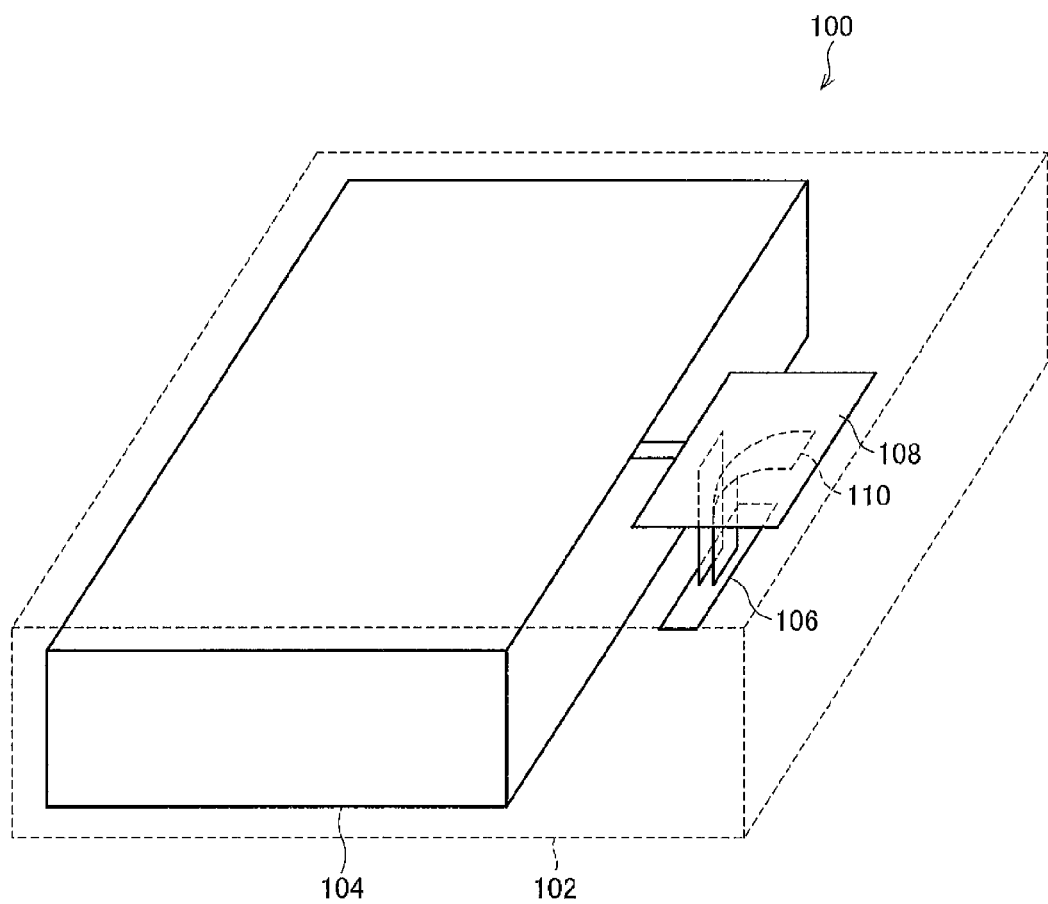
FIG. 1 is a perspective view illustrating a schematic arrangement of a battery of one embodiment (Embodiment 1) of the present invention.

FIG. 1 is a perspective view illustrating a schematic arrangement of a battery 100 of one embodiment (Embodiment 1) of the present invention. As illustrated in FIG. 1, the battery 100 includes, in a case 102, a cell 104, a circuit 108, a resonance frequency adjusting section 110, and a battery terminal 106 which is exposed from an inner surface of the case 102.

The battery terminal 106 and the circuit 108 are directly connected with each other. Further, the circuit 108, which is connected with the battery terminal 106 with one end, is directly connected with the resonance frequency adjusting section 110 via another end. Further, the resonance frequency adjusting section 110, which is connected with the circuit 108 via one end, is directly connected with a ground line of the battery terminal 106 with another end.

The case 102 is a structure for supporting and protecting the aforementioned members. The case 102 can be made of, e.g., an insulating material such as a resin.

The cell 104 is a cell made up of electrodes and an electrolyte which are employed for general batteries. For example, it is possible to employ, as the cell 104, a secondary battery such as a lithium-ion secondary battery, a lithium-ion-polymer secondary battery, and a nickel-hydrogen storage battery. However, the cell 104 is not limited to them. Other secondary batteries, primary batteries, solar batteries, fuel batteries, combinations thereof, etc. can be suitably employed as the cell 104, provided that it is possible to discharge a direct current.

The circuit 108 is constituted by a general electric circuit or a general electronic circuit. In a case where, e.g., the cell 104 is a secondary battery, the circuit 108 may include a charge control circuit. Further, the circuit 108 may include: another circuit such as a circuit for controlling a current between a solar battery and a storage battery, a charging terminal for charging a battery, a current control circuit for controlling power supply, etc. In a case where the circuit 108 includes the charge control circuit, the circuit 108 is connected with the electrodes of the cell 104. The circuit 108 may be, e.g., a DC circuit.

The battery terminal 106 is a battery connector between the battery 100 and the apparatus on which the battery 100 is mounted. The battery terminal 106 can be made from a conductive material. That is, as described above, the battery terminal 106 is exposed from the inner surface of the case 102, and can establish electrically connection with the apparatus on which the battery 100 is mounted.

The resonance frequency adjusting section 110 can DC-connect or AC-connect the circuit 108 with (the ground line of) the battery terminal 106. In the present embodiment, employed as the resonance frequency adjusting section 110 is a conductor path which is directly connected with each of the circuit 108 and the battery terminal 106. Other modes of the resonance frequency adjusting section 110 are described later.

The arrangement in which the resonance frequency adjusting section 110 is connected with the circuit 108 makes it possible to change an electrical length of a path which includes the circuit 108, and change an antenna constituted by the path from a quarter wavelength antenna to a half wavelength antenna, in contrast to a case where the resonance frequency adjusting section 110 is not connected with the circuit 108. Even if the battery 100 is not electrically connected, except via the battery terminal 106, with the apparatus on which the battery 100 is mounted, this makes it possible to appropriately suppress the deterioration in antenna characteristic of the apparatus, by largely changing a resonance frequency of the antenna constituted by the circuit 108. The following describes this in detail.

Figure 2:
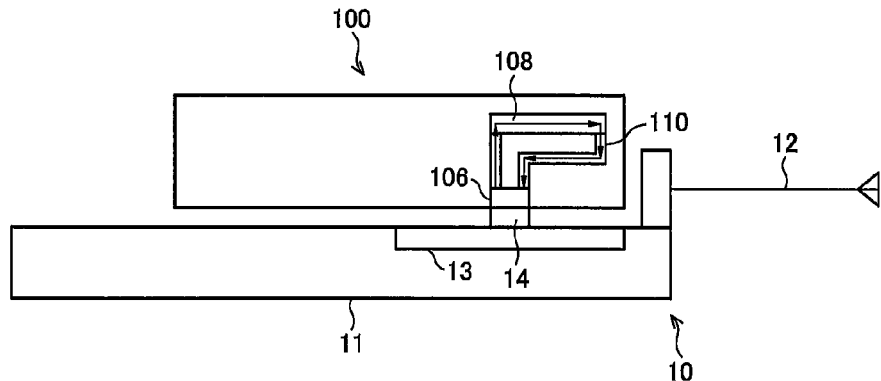
FIG. 2 is a cross-sectional view illustrating a schematic arrangement of a wireless communication apparatus on which the battery of the one embodiment (Embodiment 1) of the present invention.

FIG. 2 is a cross-sectional view illustrating a schematic arrangement of the wireless communication apparatus 10 on which battery 100 is mounted. As illustrated in FIG. 2, the wireless communication apparatus 10 includes, in a main body 11, an antenna (antenna for wireless communication) 12, a ground section 13 of a substrate of the main body 11, and an apparatus terminal 14. The wireless communication apparatus 10 is an apparatus which performs wireless communication (e.g., a mobile phone). The apparatus terminal 14 is connected with the battery terminal 106 of the battery 100 so that the battery 100 supplies power to the wireless communication apparatus 10. A ground line of the apparatus terminal 14 is connected with the ground section 13.

The antenna 12 is an antenna that the wireless communication apparatus 10 uses in performing wireless communication, and a general antenna is employed as the antenna 12. For example, the antenna 12 is not limited to this. It is possible to employ, as the antenna 12: a linear antenna such as a dipole antenna, a monopole antenna, a loop antenna, a whip antenna, and a helical antenna; a slot antenna; a patch antenna; a pattern antenna; a chip antenna; etc.

The apparatus terminal 14 is connected with the battery terminal 106 so as to serve as a battery connector. The apparatus terminal 14 can be made of a conductive material.

In the present embodiment, the circuit 108 faces the antenna 12, on the side opposite to the side where the circuit 108 is connected with the battery terminal 106.

Figure 10:
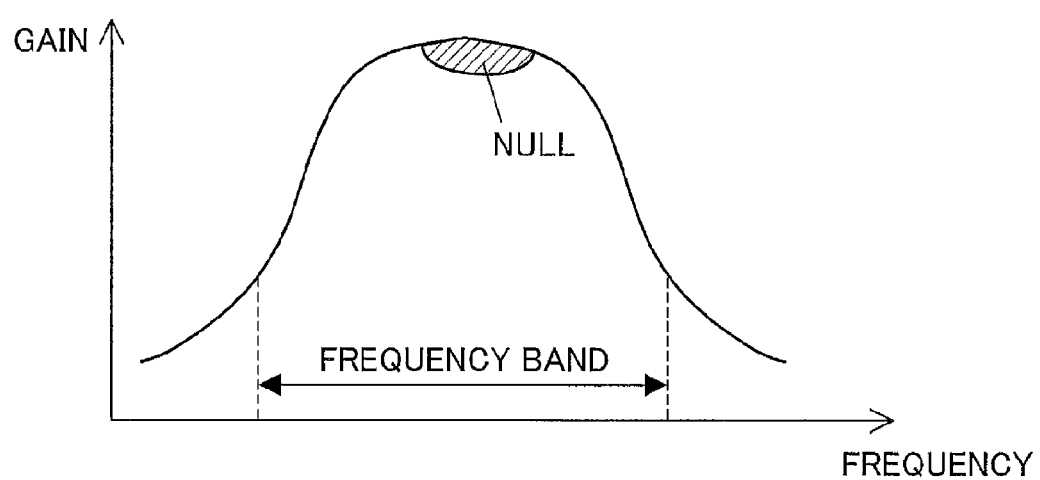
FIG. 10 is a graph for explaining deterioration in antenna characteristic of a conventional art.
Figure 11:
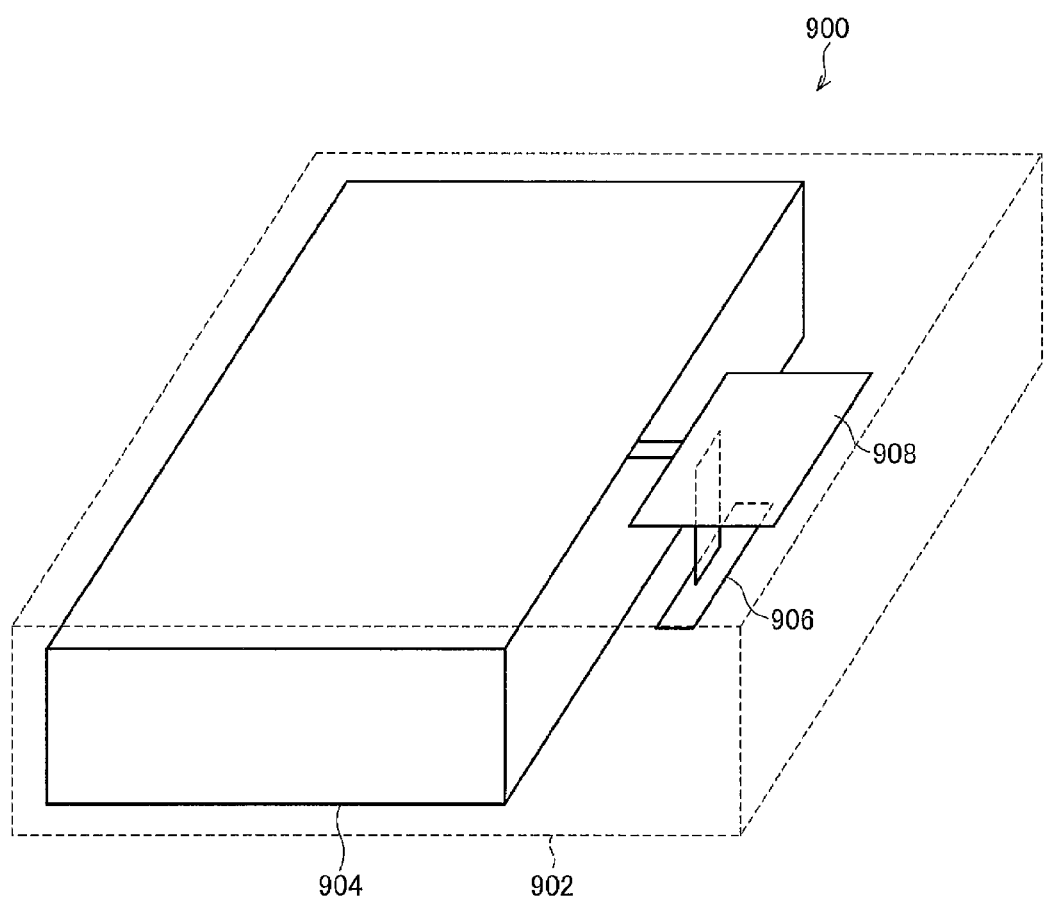
FIG. 11 is a perspective view illustrating a schematic arrangement of a battery of a conventional art.
Figure 12:
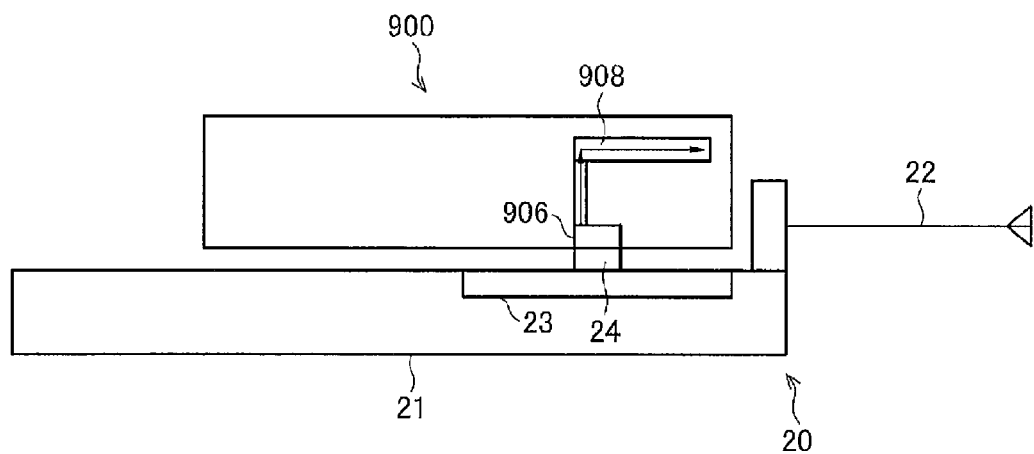
FIG. 12 is a cross-sectional view illustrating a schematic arrangement of a wireless communication apparatus of a conventional art.
Figure 13:
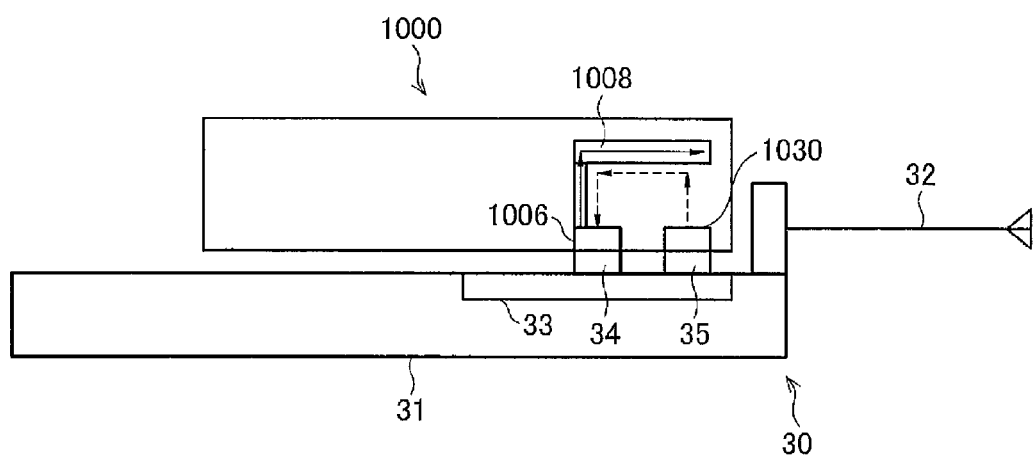
FIG. 13 is a cross-sectional view illustrating a schematic arrangement of a wireless communication apparatus of Patent Literature 1.

Accordingly, in a case where the resonance frequency adjusting section 110 is not provided, the circuit 108 operates as an antenna having a directionality toward the antenna 12. This can lead to the deterioration in antenna characteristic of the antenna 12. That is, the circuit 108 operates as a $\frac{1}{4}\lambda$ antenna which is grounded only at its one end, and in a case where $\lambda$, i.e., a resonance frequency falls within a frequency band of the antenna 12, the circuit 108 deteriorates the antenna characteristic as shown in FIG. 10.

In contrast, the battery 100 of the present embodiment is arranged such that the resonance frequency adjusting section 110 is connected with the circuit 108. This makes it possible to prevent the deterioration in antenna characteristic even if other conditions are the same as those of the aforementioned case where the resonance frequency adjusting section 110 is not provided. That is, with the arrangement in which the resonance frequency adjusting section 110 is connected with the circuit 108, and the resonance frequency adjusting section 110 is connected with the ground line of the battery terminal 106, the antenna constituted by the circuit 108 and the resonance frequency adjusting section 110 operates like a dipole antenna with a grounded terminal, and serves as a $\frac{1}{2}\lambda$ antenna. Further, the electrical length of the antenna is different from that of the antenna constituted by the circuit 108 only. This causes a large change in $\lambda$, i.e., in resonance frequency of the case without the resonance frequency adjusting section 110. This makes it possible to shift the resonance frequency outside the frequency band of the antenna 12. This makes it possible to prevent the deterioration in antenna characteristic.

This can be described from another point of view as below. In a case where the antenna characteristic is deteriorated for the reason that an electrical length of the circuit 108 is close to "$(1+2n)/4\lambda$" which $\lambda$ corresponds to an used frequency, the present invention makes it possible to prevent, in one aspect, the deterioration in antenna characteristic in such a manner that the resonance frequency adjusting section 110 is connected with the circuit 108 so that the electrical length of the antenna constituted by the circuit 108 and the resonance frequency adjusting section 110 is shifted to one other than "$(1+2n)/2\lambda$" which $\lambda$ corresponds to the used frequency. This prevention is easy because $(1+2n)/4\lambda$ and $(1+2n)/2\lambda$ are very different from each other.

The frequency band of the antenna 12 refers to a frequency range for the intended use of the antenna 12, and can take on various values depending on uses of the wireless communication apparatus 10. For example, in a case where the wireless communication apparatus 10 is a mobile phone, the frequency band of the antenna 12 can be a frequency band which is selected by an operator (carrier).

Thus, the battery 100 makes it possible to prevent the deterioration in antenna characteristic of the antenna 12, without electrically connecting with the wireless communication apparatus 10 except via the battery terminal 106. Therefore, the battery 100 is suitably employed as a battery to be mounted on the wireless communication apparatus 10. More specifically, the battery 100 is arranged such that the resonance frequency of the antenna constituted by the circuit 108 and the resonance frequency adjusting section 110 is shifted to one outside the frequency band of the antenna 12. This makes it possible to suitably employ the battery 100 as a battery to be mounted on the wireless communication apparatus 10, without deteriorating the antenna characteristic of the antenna 12. The same holds for a case where the radiation from the antenna is directed to the antenna 12.

Further, the battery 100 is not connected with the wireless communication apparatus 10 except via the battery terminal 106. This requires fabrication of the battery 100 only. This makes it possible to reduce costs, as compared to the technique of Patent Literature 1 where it is necessary to fabricate both the battery and the substrate of the wireless communication apparatus. Further, this makes it possible to readily realize a mechanism for mounting and demounting of the battery.

Embodiment 2

Figure 3:
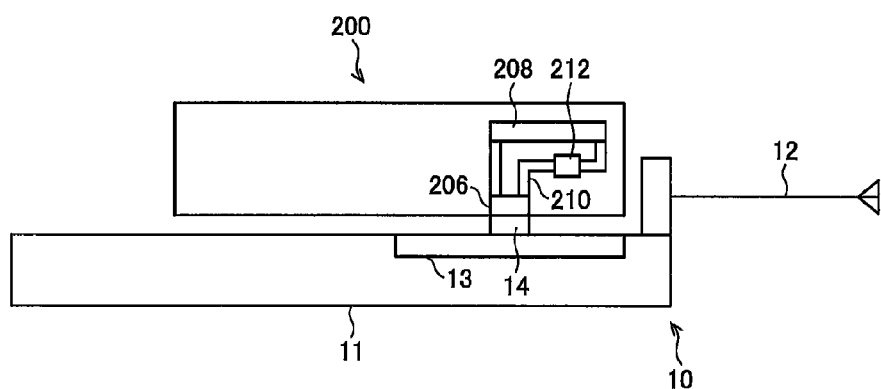
FIG. 3 is a cross-sectional view illustrating a schematic arrangement of a wireless communication apparatus on which a battery of one embodiment (Embodiment 2) of the present invention.

FIG. 3 is a cross-sectional view illustrating a schematic arrangement of a wireless communication apparatus 10 on which a battery 200 of one embodiment (Embodiment 2) of the present invention is mounted. Except that the battery 200 is mounted on the wireless communication apparatus 10, the wireless communication apparatus 10 may be the same as that of Embodiment 1, and the following therefore omits to repeat the description thereof.

As illustrated in FIG. 3, the battery 200 includes a battery terminal 206, a circuit 208, and a resonance frequency adjusting section 210. The battery 200 is different from the battery 100 of Embodiment 1 in that the resonance frequency adjusting section 210 includes an electronic component 212.

The electronic component 212 may be an electronic component which can readily change an electrical length of a path which includes the electronic component itself. For example, a coil (choke coil), a capacitor, or the like may be employed as the electronic component 212 solely or in combination. With the arrangement in which the resonance frequency adjusting section 210 includes the electronic component 212, the electrical length of the antenna constituted by the circuit 208 and the resonance frequency adjusting section 210 can be readily set by appropriately changing constants (inductance and capacitance) of the electronic component 212.

The constants (inductance and capacitance) of the electronic component 212 may be set on an experimental basis so that decrease in gain of the antenna 12 in the used frequency band is prevented as possible.

Embodiment 3

Figure 4:
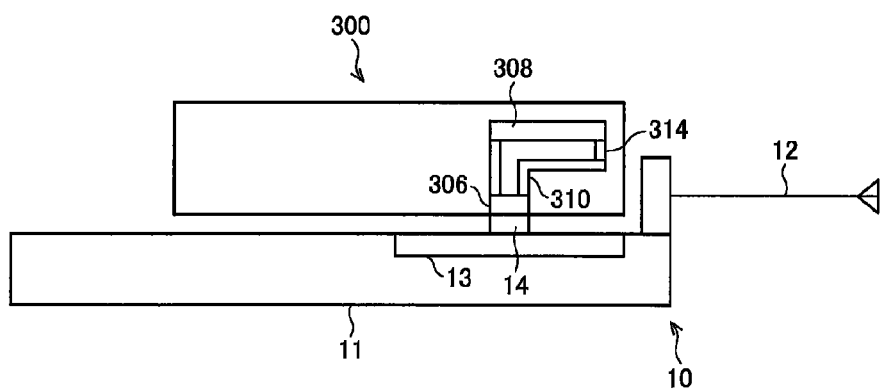
FIG. 4 is a cross-sectional view illustrating a schematic arrangement of a wireless communication apparatus on which a battery of one embodiment (Embodiment 3) of the present invention.

FIG. 4 is a cross-sectional view illustrating a schematic arrangement of a wireless communication apparatus 10 on which a battery 300 of one embodiment (Embodiment 3) of the present invention is mounted. Except that the battery 300 is mounted on the wireless communication apparatus 10, the wireless communication apparatus 10 may be the same as that of Embodiment 1, and the following therefore omits to repeat the description thereof.

As illustrated in FIG. 4, the battery 300 includes a battery terminal 306, a circuit 308, and a resonance frequency adjusting section 310. The battery 300 is different from the battery 100 in that the resonance frequency adjusting section 310 is connected with the circuit 308 via a capacitance coupling (capacitive coupling) 314.

The capacitance coupling 314 may be anything, provided that it is possible to DC-insulate and AC-connect the resonance frequency adjusting section 310 and the circuit 308 from/with each other. The capacitance coupling 314 may be, e.g., a capacitor.

As described above, the circuit 308 is a DC circuit such as a charge control circuit in many cases. Therefore, a direct current does not flow from the circuit 308 to the resonance frequency adjusting section 310 for the reason that the resonance frequency adjusting section 310 and the circuit 308 are DC-insulated from each other. As a result, the provision of the resonance frequency adjusting section 310 hardly affects the operation of the circuit 308.

Particularly in a case where the resonance frequency adjusting section 310 is directly connected with the circuit 308, the circuit may short-circuit since the circuit 308 is a DC circuit. Even in such a case, a short-circuit of the circuit can be prevented since the battery 300 of the present embodiment is arranged such that the circuit 308 and the resonance frequency adjusting section 310 are DC-insulated from each other.

Thus, the effect of the present invention can be desirably obtained by employing, in one aspect, such a seemingly-redundant arrangement that another circuit is capacitively-coupled with the circuit 308 which is a DC circuit.

Embodiment 4

Figure 5:
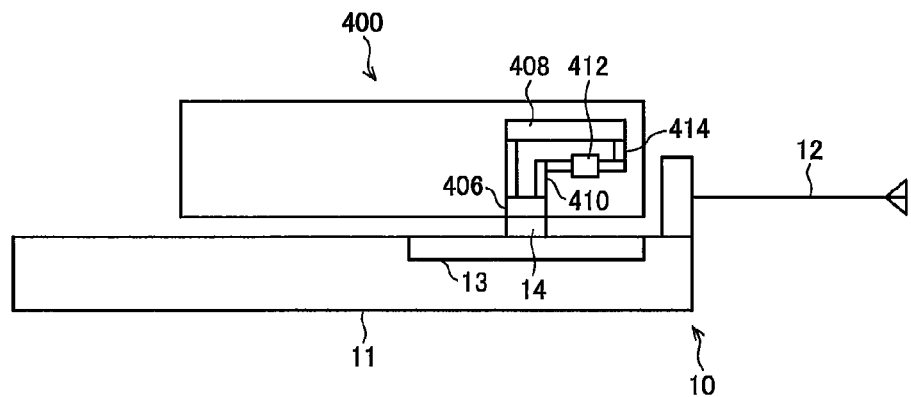
FIG. 5 is a cross-sectional view illustrating a schematic arrangement of a wireless communication apparatus on which a battery of one embodiment (Embodiment 4) of the present invention.

FIG. 5 is a cross-sectional view illustrating a schematic arrangement of a wireless communication apparatus 10 on which a battery 400 of one embodiment (Embodiment 4) of the present invention is mounted. Except that the battery 400 is mounted on the wireless communication apparatus 10, the wireless communication apparatus 10 may be the same as that of Embodiment 1, and the following therefore omits to repeat the description thereof.

As illustrated in FIG. 5, the battery 400 includes a battery terminal 406, a circuit 408, and a resonance frequency adjusting section 410. The battery 400 is different from the battery 100 of Embodiment 1 in that the resonance frequency adjusting section 410 includes an electronic component 212, and is connected with the circuit 408 via a capacitance coupling 414.

Thus, it is possible to employ a combination of Embodiments 2 and 3. This allows the battery 400 of the present embodiment to readily set the electrical length of the antenna constituted by the circuit 208 and the resonance frequency adjusting section 210, by appropriately changing constants (inductance and capacitance) of the electronic component 212. In addition, it is possible to desirably prevent an effect on the operation of the circuit 308 which effect is brought about by the provision of the resonance frequency adjusting section 310, particularly, the occurrence of a short-circuit.

Embodiment 5

Figure 6:
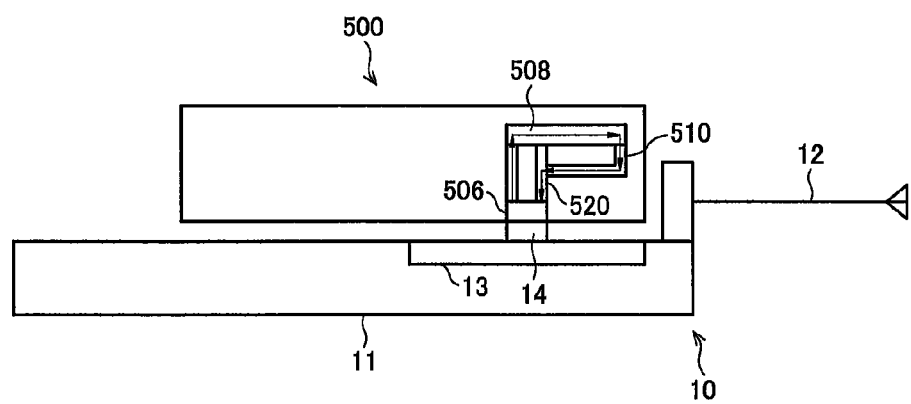
FIG. 6 is a cross-sectional view illustrating a schematic arrangement of a wireless communication apparatus on which a battery of one embodiment (Embodiment 5) of the present invention.

FIG. 6 is a cross-sectional view illustrating a schematic arrangement of a wireless communication apparatus 10 on which a battery 500 of one embodiment (Embodiment 5) of the present invention is mounted. Except that the battery 500 is mounted on the wireless communication apparatus 10, the wireless communication apparatus 10 may be the same as that of Embodiment 1, and the following therefore omits to repeat the description thereof.

As illustrated in FIG. 6, the battery 500 includes a battery terminal 506, a circuit 508, and a resonance frequency adjusting section 510. The battery 500 further includes a ground section (grounding system) 520 inside the battery which ground section 520 is connected with the ground line of the battery terminal 506. The resonance frequency adjusting section 510 is connected with the ground section 520 instead of the battery terminal 506 (in the present embodiment too, the resonance frequency adjusting section 510 is electrically connected with the battery terminal 506 via the ground section 520). This is the difference between the battery 500 and the battery 100 of Embodiment 1.

As is the case with the battery 100 of Embodiment 1, the battery 500 of the present embodiment is arranged such that the resonance frequency adjusting section 510 is electrically connected with the ground line of the battery terminal 506 via the ground section 520. Accordingly, the antenna constituted by the circuit 508 and the resonance frequency adjusting section 510 operates like a dipole antenna with a grounded terminal, and serves as a ½λ antenna. Further, the electrical length of the antenna is different from that of the antenna constituted by the circuit 508 only. This causes a large change in λ, i.e., in resonance frequency of the case without the resonance frequency adjusting section 510. This makes it possible to shift the resonance frequency outside the frequency band of the antenna 12. This makes it possible to prevent the deterioration in antenna characteristic.

Even in a case where the resonance frequency adjusting section 510 is connected with the ground section 520, the resonance frequency adjusting section 510 (i) may include an electronic component as is the case with the battery 200 (Embodiment 2), (ii) may be AC-connected with the circuit 508 via a capacitance coupling as is the case with the battery 300 (Embodiment 3), or (iii) may have both arrangements of (i) and (ii) as is the case with the battery 400 (Embodiment 4).

Embodiment 6

Figure 7:
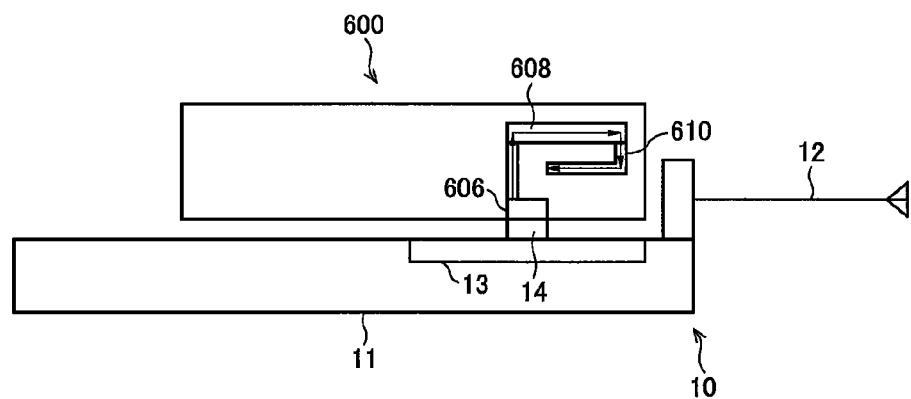
FIG. 7 is a cross-sectional view illustrating a schematic arrangement of a wireless communication apparatus on which a battery of one embodiment (Embodiment 6) of the present invention.

FIG. 7 is a cross-sectional view illustrating a schematic arrangement of a wireless communication apparatus 10 on which a battery 600 of one embodiment (Embodiment 6) of the present invention is mounted. Except that the battery 600 is mounted on the wireless communication apparatus 10, the wireless communication apparatus 10 may be the same as that of Embodiment 1, and the following therefore omits to repeat the description thereof.

As illustrated in FIG. 7, the battery 600 includes a battery terminal 606, a circuit 608, and a resonance frequency adjusting section 610. The battery 600 is different from the battery 100 of Embodiment 1 in that the resonance frequency adjusting section 610 is not electrically connected with any member other than the circuit 608, instead of being connected with the battery terminal 606.

As is the case with Embodiment 1, in a case where the resonance frequency adjusting section 610 is not provided, the circuit 608 operates as an antenna having a directionality toward the antenna 12, and this can lead to the deterioration in antenna characteristic of the antenna 12. That is, the circuit 608 operates as a ¼λ antenna which is grounded only at its one end, and in a case where λ, i.e., a resonance frequency falls within the frequency band of the antenna 12, the circuit 608 deteriorates the antenna characteristic as shown in FIG. 10.

In contrast, the battery 600 of the present embodiment is arranged such that the resonance frequency adjusting section 610 is connected with the circuit 608. This makes it possible to prevent the deterioration in antenna characteristic even if other conditions are the same as those of the aforementioned case where the resonance frequency adjusting section 610 is not provided. That is, with the arrangement in which the resonance frequency adjusting section 610 is connected with the circuit 608, the electrical length of the antenna constituted by the circuit 608 and the resonance frequency adjusting section 610 is different from that of the antenna constituted by the circuit 608 only. This causes a change in λ, i.e., in resonance frequency of the case without the resonance frequency adjusting section 610. This makes it possible to shift the resonance frequency outside the frequency band of the antenna 12. This makes it possible to prevent the deterioration in antenna characteristic.

This can be described from another point of view as below. In a case where the antenna characteristic is deteriorated for the reason that an electrical length of the circuit 608 is close to "(1+2n)/4λ" which λ corresponds to an used frequency, the present invention makes it possible to prevent, in one aspect, the deterioration in antenna characteristic in such a manner that the resonance frequency adjusting section 610 is connected with the circuit 608 so that the electrical length of the antenna constituted by the circuit 608 and the resonance frequency adjusting section 610 is shifted to one other than "(1+2n)/4λ" which λ corresponds to the used frequency.

Further, as is the case with the battery 100 of Embodiment 1, the battery 600 of the present embodiment is not connected with the wireless communication apparatus 10 except via the battery terminal. This requires fabrication of the battery only. This makes it possible to reduce costs, as compared to the technique of Patent Literature 1 where it is necessary to fabricate both the battery and the substrate of the wireless communication apparatus. Further, this makes it possible to readily realize a mechanism for mounting and demounting of the battery.

Embodiment 7

Figure 8:
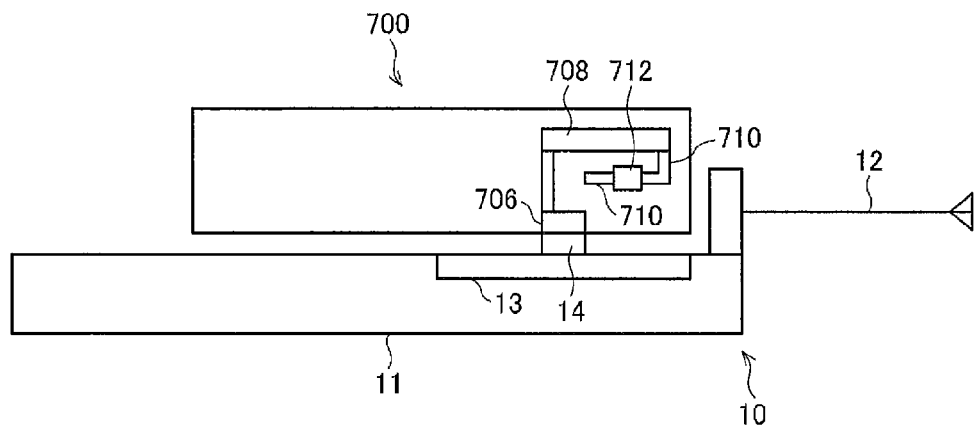
FIG. 8 is a cross-sectional view illustrating a schematic arrangement of a wireless communication apparatus on which a battery of one embodiment (Embodiment 7) of the present invention.

FIG. 8 is a cross-sectional view illustrating a schematic arrangement of a wireless communication apparatus 10 on which a battery 700 of one embodiment (Embodiment 7) of the present invention is mounted. Except that the battery 700 is mounted on the wireless communication apparatus 10, the wireless communication apparatus 10 may be the same as that of Embodiment 1, and the following therefore omits to repeat the description thereof.

As illustrated in FIG. 8, the battery 700 includes a battery terminal 706, a circuit 708, and a resonance frequency adjusting section 710. The battery 700 is different from the battery 600 of Embodiment 6 in that the resonance frequency adjusting section 710 includes an electronic component 712.

The electronic component 712 may be the same as the electronic component 212 of Embodiment 2. As is the case with the battery 200 of Embodiment 2, the battery 700 of the present embodiment is arranged such that the electrical length of the antenna constituted by the circuit 708 and the resonance frequency adjusting section 710 can be readily set by appropriately changing constants (inductance and capacitance) of the electronic component 712.

As compared to the battery 200 of Embodiment 2, it is more important for the battery 700 of the present embodiment to change the electrical length of the antenna constituted by the circuit 708 and the resonance frequency adjusting section 710 from the electrical length of the antenna constituted by the circuit 708 only, from a viewpoint of prevention of the deterioration in antenna characteristic. Therefore, the provision of the electronic component 712 makes it possible to desirably prevent the deterioration in antenna characteristic.

Embodiment 8

Figure 9:
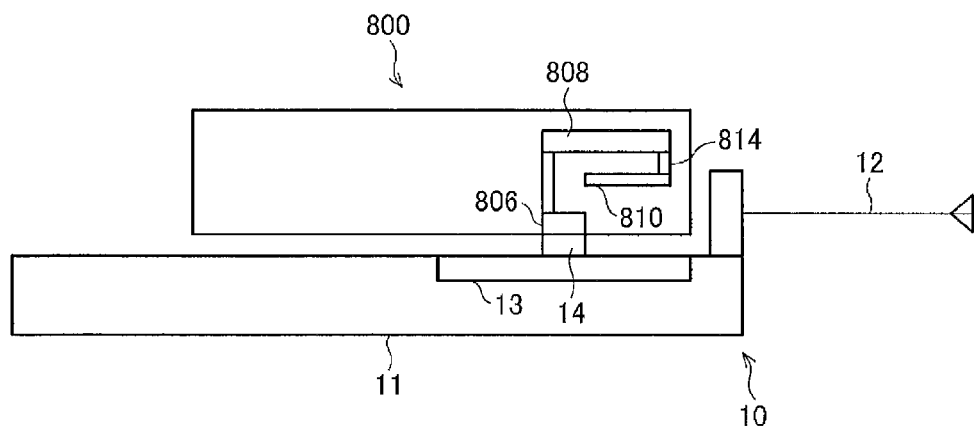
FIG. 9 is a cross-sectional view illustrating a schematic arrangement of a wireless communication apparatus on which a battery of one embodiment (Embodiment 8) of the present invention.

FIG. 9 is a cross-sectional view illustrating a schematic arrangement of a wireless communication apparatus 10 on which a battery 800 of one embodiment (Embodiment 8) of the present invention is mounted. Except that the battery 800 is mounted on the wireless communication apparatus 10, the wireless communication apparatus 10 may be the same as that of Embodiment 1, and the following therefore omits to repeat the description thereof.

As illustrated in FIG. 9, the battery 800 includes a battery terminal 806, a circuit 808, and a resonance frequency adjusting section 810. The battery 800 is different from the battery 600 of Embodiment 6 in that the resonance frequency adjusting section 810 is connected with the circuit 808 via a capacitance coupling (capacitive coupling) 814.

The capacitance coupling 814 may be the same as capacitance coupling 314 of Embodiment 4. In the battery 800 of the present embodiment, a direct current does not flow from the circuit 808 to the resonance frequency adjusting section 810, as is the case with the battery 300 of Embodiment 3. As a result, the provision of the resonance frequency adjusting section 810 hardly affects the operation of the circuit 808.

As is the case with the battery 500 of Embodiment 5, the battery 800 of the present embodiment may be arranged such that the resonance frequency adjusting section 810 further includes an electronic component. This makes it possible to further obtain the effect from the arrangement of Embodiment 7.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

That is, a battery of the present invention includes: a battery terminal; a circuit being electrically connected with the battery terminal; and a resonance frequency adjusting section being directly connected or capacitively-coupled with the circuit, and being electrically connected with the battery terminal not via the circuit.

Further, a battery of the present invention may include: a battery terminal; a circuit being electrically connected with the battery terminal; and a resonance frequency adjusting section being directly connected or capacitively-coupled with the circuit, and being electrically connected with the circuit only.

The battery may be arranged such that the resonance frequency adjusting section includes an electronic component capable of adjusting an electrical length. Further, the battery may be arranged such that: the electronic component includes at least a capacitor or a coil.

According to the arrangement, an electrical length of an antenna constituted by the circuit which electrical length is changed by connecting the resonance frequency adjusting section with the circuit is changed depending not only on a length of the resonance frequency adjusting section but also on characteristics (e.g., inductance of the coil, capacitance of the capacitor, etc.) of the electronic component. This makes it possible to readily adjust the electrical length of the antenna so that the resonance does not deteriorate an antenna characteristic.

The battery is preferably arranged such that the resonance frequency adjusting section is capacitively-coupled with the circuit.

According to the arrangement, the resonance frequency adjusting section is capacitively-coupled with the circuit so as not to allow a direct current to pass through. The circuit to be provided in the battery is, e.g., a charge control circuit, and is a DC circuit in many cases. Accordingly, with the arrangement above, a direct current does not flow from the circuit to the resonance frequency adjusting section. This makes it possible to suppress the deterioration in antenna characteristic, with hardly affecting the operation of the circuit. That is, the effect can be obtained by employing such a seemingly-redundant arrangement that another circuit is capacitively-coupled with the circuit which is a DC circuit.

In a case where, particularly, the resonance frequency adjusting section is electrically connected with the battery terminal not via the circuit, and a direct current passes through the resonance frequency adjusting section, the circuit may short-circuit. Even in such a case, the arrangement above makes it possible to prevent a short-circuit.

The battery may include: a grounding system being electrically connected with the battery terminal, the resonance frequency adjusting section being electrically connected with the battery terminal via the grounding system.

According to the arrangement, the resonance frequency adjusting section is connected with the battery terminal via the grounding system. This makes it possible to electrically connect the resonance frequency adjusting section with the battery terminal desirably.

A wireless communication apparatus of the present invention includes: a wireless communication antenna; and a battery of the present invention.

According to the arrangement, the battery is unlikely to deteriorate an antenna characteristic of the antenna. Therefore, the battery can be suitably employed as a battery to be mounted on the wireless communication apparatus.

The wireless communication apparatus is preferably arranged such that an antenna constituted by the circuit and the resonance frequency adjusting section has a resonance frequency outside a frequency band of the wireless communication antenna.

According the arrangement, the antenna constituted by the circuit and the resonance frequency adjusting section has a resonance frequency outside the frequency band of the wireless communication antenna. The battery does not deteriorate an antenna characteristic of the wireless communication antenna. Therefore, the battery can be suitably employed as a battery to be mounted on the wireless communication apparatus.

The wireless communication apparatus is preferably arranged such that: radiation from the antenna is directional to the wireless communication antenna.

According to the arrangement, even if the radiation from the antenna is directed to the wireless communication antenna, the antenna constituted by the circuit and the resonance frequency adjusting section does not deteriorate the antenna characteristic of the wireless communication antenna, since the antenna constituted by the circuit and the resonance frequency adjusting section has a resonance frequency outside the frequency band of the wireless communication antenna. Therefore, the battery can be suitably employed as a battery to be mounted on the wireless communication apparatus.

INDUSTRIAL APPLICABILITY

The present invention is applicable in fields of manufacture of batteries having internal circuits and of wireless communication apparatuses on which such batteries are mounted.

REFERENCE SIGNS LIST 10, 20, 30 Wireless communication apparatus
11, 21, 31 Main body
12, 22, 32 Antenna
13, 23, 33, 520 Ground section
14, 24, 34 Apparatus terminal
100, 200, 300, 400, 500,
600, 700, 800, 900, 1000 Battery
102, 902 Case
104, 904 Cell
106, 206, 306, 406, 506,
606, 706, 806, 906, 1006 Battery terminal
108, 208, 308, 408, 508,
608, 708, 808, 908, 1008 Circuit
110, 210, 310, 410, 510,
610, 710, 810 Resonance frequency adjusting section
212, 412, 712 Electronic component
314, 414, 814 Capacitance coupling section
35, 1030 Connecting section

The invention claimed is:

1. A battery comprising:
a battery terminal;
a charge control circuit being electrically connected with the battery terminal;
a resonance frequency adjusting section being directly connected or capacitively-coupled with the charge control circuit, and being directly connected with the battery terminal;
a cell connected with the charge control circuit; and
a case in which the cell, the charge control circuit, and the resonance frequency adjusting section are stored,
the battery terminal being exposed from the case.

2. The battery as set forth in claim 1, wherein:
the resonance frequency adjusting section includes an electronic component capable of adjusting an electrical length.

3. The battery as set forth in claim 2, wherein:
the electronic component includes at least a capacitor or a coil.

4. The battery as set forth in claim 1, wherein:
the resonance frequency adjusting section is capacitively-coupled with the charge control circuit.

5. The battery as set forth in claim 1, further comprising:
a grounding system being electrically connected with the battery terminal,
the resonance frequency adjusting section being electrically connected with the battery terminal via the grounding system.

6. A wireless communication apparatus comprising:
a wireless communication antenna; and
a battery recited in claim 1.

7. A battery comprising:
a battery terminal;
a charge control circuit being electrically connected with the battery terminal; and
a resonance frequency adjusting section being directly connected or capacitively-coupled with the charge control circuit, and being electrically connected with the charge control circuit only.

8. The battery as set forth in claim 7, wherein:
the resonance frequency adjusting section includes an electronic component capable of adjusting an electrical length.

9. The battery as set forth in claim 8, wherein:
the electronic component includes at least a capacitor or a coil.

10. The battery as set forth in claim 7, wherein:
the resonance frequency adjusting section is capacitively-coupled with the circuit.

11. The battery as set forth in claim 7, further comprising:
a grounding system being electrically connected with the battery terminal,
the resonance frequency adjusting section being electrically connected with the battery terminal via the grounding system.

12. A wireless communication apparatus comprising:
a wireless communication antenna; and
a battery recited in claim 7.

13. The wireless communication apparatus as set forth in claim 12, wherein:
an antenna constituted by the charge control circuit and the resonance frequency adjusting section has a resonance frequency outside a frequency band of the wireless communication antenna.

14. The wireless communication apparatus as set forth in claim 13, wherein:
radiation from the antenna is directional to the wireless communication antenna.

15. A wireless communication apparatus comprising:
a wireless communication antenna; and
a battery, wherein:
an antenna constituted by the charge control circuit and the resonance frequency adjusting section has a resonance frequency outside a frequency band of the wireless communication antenna.

16. The wireless communication apparatus as set forth in claim 15, wherein:
radiation from the antenna is directional to the wireless communication antenna.

* * * * *